Oct. 13, 1925.  
E. C. LIPPS  
1,556,702  
METHOD OF SECURING A METALLIC COMPOSITION TO METAL MEMBERS  
Filed Jan. 10, 1924

Inventor  
Evrah C. Lipps  
By Milton Tibbetts  
Attorney

Patented Oct. 13, 1925.

1,556,702

UNITED STATES PATENT OFFICE.

EVRAH C. LIPPS, OF DETROIT, MICHIGAN, ASSIGNOR TO PACKARD MOTOR CAR COMPANY, OF DETROIT, MICHIGAN, A CORPORATION OF MICHIGAN.

METHOD OF SECURING A METALLIC COMPOSITION TO METAL MEMBERS.

Application filed January 10, 1924. Serial No. 685,361.

*To all whom it may concern:*

Be it known that I, EVRAH C. LIPPS, a citizen of the United States, and resident of Detroit, Wayne County, State of Michigan, have invented certain new and useful Improvements in Methods of Securing a Metallic Composition to Metal Members, of which the following is a specification.

The present invention relates to a method of securing an alloy or a metallic composition to a metal member.

In certain arts it has been common practice to attach to metal articles parts composed of various metallic compositions or alloys which have characteristics desired in that portion of the article to which the part is secured. An instance of such practice is to be found in the metal working art wherein tools, particularly cutting tools, are frequently tipped or provided with portions of different compositions having superior qualities of toughness, hardness, etc. Such tips are often attached by welding, or by fusion, but it frequently happens that the behavior of the alloy under sudden temperature rises or other conditions common to welding, make such methods of attachment difficult and unduly expensive.

A specific example of such use of alloys is found in the tipping or heading of steel or iron tool bodies or shanks with the alloy known as "stellite", which is a composition containing chromium, cobalt and tungsten in various proportions. The salient characteristic of stellite is extreme hardness and it frequently forms the cutting edge of tools used in large metal working machinery. For the purpose of illustration this invention will be described in connection with the welding of stellite tips to steel members, but it is to be understood that the invention is not so limited, but includes the attachment of other alloys and compositions.

The objects and features of novelty will be apparent from the description, taken in connection with the drawing, in which—

Figures 1, 2, 3, 4, 5:
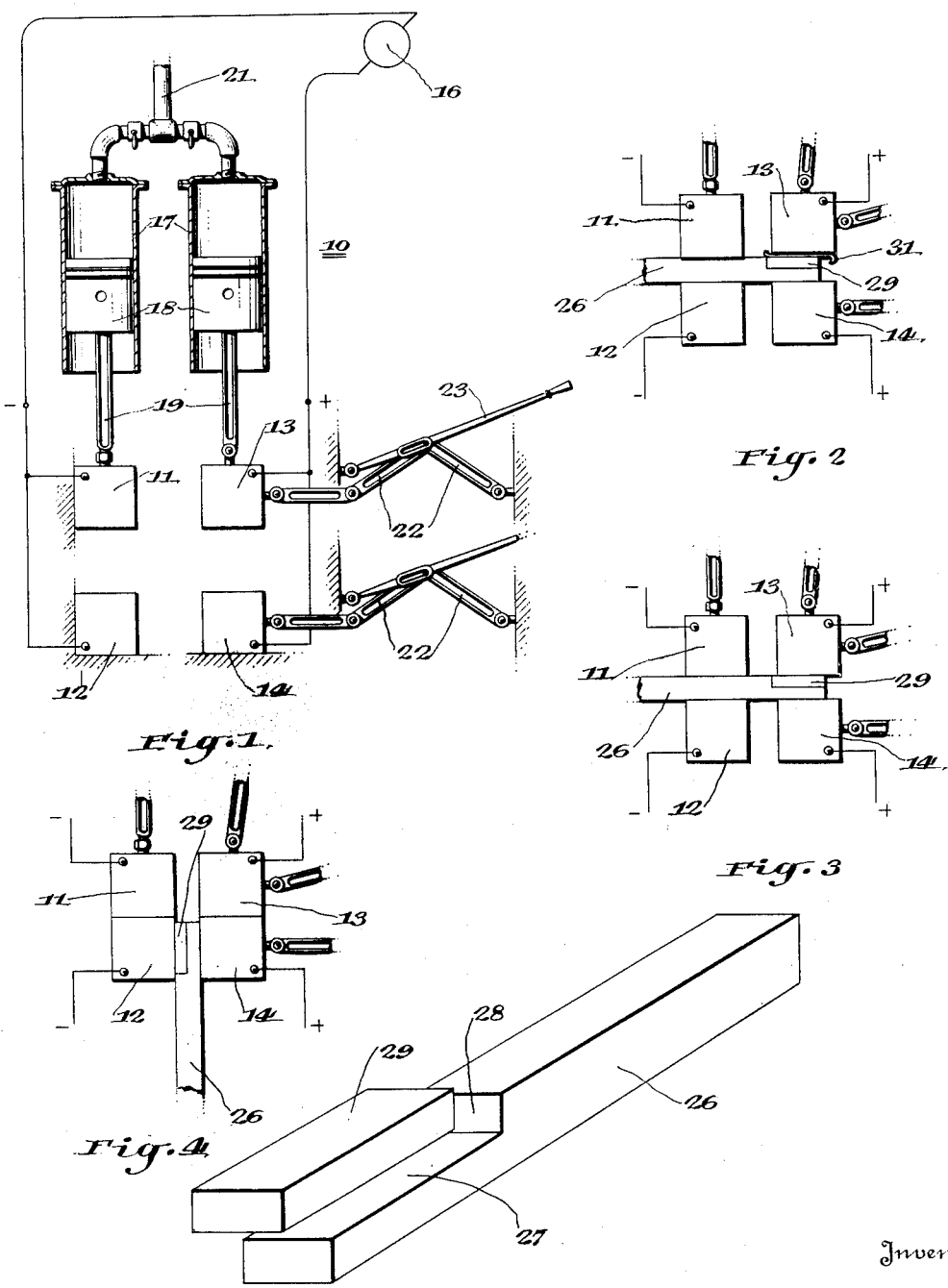
Fig. 1 is a schematic representation of a machine in which the present invention may be carried out.
Fig. 2 is a diagrammatic showing of a part of the apparatus shown in Fig. 1, illustrating the heating step of the method of this invention.
Figs. 3 and 4 are diagrams similar to Fig. 2, illustrating the welding steps of the method.
Fig. 5 is a perspective view of a steel member, with its associate tip of stellite or other alloy slightly displaced from position thereon.

It has been found in welding pieces of stellite, and certain other alloys, to metal members such as tool shanks, that the sudden application of the welding heat to the hard alloy causes it to crack and crumble. For this reason it has been the practice in thus securing the parts, to slowly pre-heat the stellite tip, gradually raising its temperature to a temperature nearly that at which welding is carried out. It is then transferred from the pre-heating device to the welding machine in which the junction is effected. Such pre-heating is slow and expensive and requires the operation of a separate heating means, such as a gas oven. This invention contemplates the pre-heating of the stellite in the same machine and by the same means as is employed in making the weld.

Referring to the drawing, at 10 is indicated a welding machine of well known construction in which the necessary heat is developed by the resistance of the work to the passage of an electric current. The machine 10 is provided with suitable electrodes, by means of which the current is conducted to and from the work, and as shown these electrodes take the form of clamping jaws or blocks 11, 12, 13 and 14. The blocks 11 and 12 are electrically connected to one terminal of any suitable source of electric current, such as the generator 16, and the blocks 13 and 14 are electrically connected to the other terminal thereof, suitable control apparatus (not shown) being inserted in the circuit.

The blocks 11 and 13 are movable toward and from the cooperating blocks 12 and 14, and are preferably provided with suitable power actuating means, such as the air cylinders 17, and the pistons 18 and rods 19, so that when connected to a suitable source of compressed air, as indicated at 21, a powerful clamping action may be developed between the pairs of respective clamping blocks. The blocks 13 and 14 are also each movable toward the corresponding blocks 11 and 12 respectively, to effect a clamping action therebetween. Suitable manually operated devices, such as the toggles 22 and levers 23, are provided for this purpose. The block 12 is stationary and is rigidly secured to the machine 10 in any convenient manner (not shown).

At 26 is illustrated the work, which consists in the present instance of a straight bar of steel forming the body or shank of a metal cutting tool. This bar is provided at one end with a recess or notch, having a flat face 27, and an inner face or shoulder 28 at right angles thereto. The recess is adapted to position a piece 29 of stellite, which is to be welded therein to form the cutting edge for the tool. To effect such welding, the piece 28 must be pressed heavily into position in the notch while both pieces are raised to a welding heat as is well understood. In order to prevent the cracking of the stellite piece 29 from a too sudden rise in temperature to welding heat, it is preheated in position in its notch. The assembled pieces 26 and 29 are first placed between the blocks 13 and 14 and are electrically insulated from the block 13 by the insertion of a thin strip 31 of suitable material such as mica. The blocks 11 and 13 are then lowered into clamping engagement with the parts, thus holding the bar 26 and piece 29 rigidly in position, as shown in Fig. 2. Current from the generator 16 is now turned on and flows through the circuit from the electrodes 11 and 12 through the bar 26 and the contacting electrode 14, and returns to the generator. The resistance to flow of the current through the bar 26 increases the temperature of this member, particularly in the reduced section adjacent the notch, wherein the current density is much increased, since flow of current through the piece 29 is prevented by the mica insulation. The stellite piece 29 is heated by conduction from the bar 26 and the two pieces slowly rise in temperature as the current is permitted to flow through the circuit. Finally a point is reached where both the bar 26 and the stellite piece 29 have been sufficiently pre-heated to obviate risk of cracking of the stellite under application of the higher welding heat. At this point in the process the block 13 is raised and the insulating strip 31 removed. The block 13 is then returned to position in contact with the piece 29, as clearly illustrated in Fig. 3. The full current is now permitted to flow through the electrical circuit, and this current now flows from the blocks 11 and 12 through the bar 26 and the electrode 14, and through the piece 29 and the electrode 13 in parallel, so that the piece 29 is directly heated by the flow of current therethrough. This shortly raises its temperature to the point at which welding can be performed, particularly the inner end of the piece 29 and the shoulder 28 of the notch, which surfaces constitute the principal resistance to the flow of current. Air is then admitted to the cylinders 17, producing on the blocks 11 and 13 a pressure sufficient to complete the weld in the region of the shoulder 28.

The piece 26 is then removed and is placed between the blocks 12 and 14 in a position at right angles to its previous position, as clearly shown in Fig. 4. The blocks 11 and 13 are placed in contact with the blocks 12 and 14 respectively and the current is again turned on. This current now flows from block 12 to block 14 in series through the pieces 29 and 26, so that the face 27 of the notch and the adjacent face of the piece 28 constitute the principal resistance. In consequence, these surfaces become highly heated, and the weld is completed by pressure exerted between the blocks 12 and 14 by means of the toggle 22 and the lever 23. In this manner the entire contacting surface of the stellite piece 29 is permanently secured to the steel piece 26.

It will be observed that by this method a rigid and easy union of the alloy with the metal member is effected, while the slow and costly pre-heating of the alloy in a separate furnace or oven is obviated. Furthermore, all danger of overheating and cracking the expensive alloy is removed, and considerable handling of the parts is avoided.

Although a specific method has been described, it is to be understood that the invention is not thus limited, but includes modifications and changes which come within the scope of the appended claims.

What is claimed is:

1. The process of attaching alloy tips to metal members which consists in first positioning the tip on the member; then in passing a heating current through the member to heat the tip by conduction; and thereafter passing welding current through the member and the tip.

2. The process of attaching alloy tips to metal members which consists in heating the member and the tip by passing current through the member only; and thereafter welding the tip to the member by passing welding current through both the tip and the member.

3. The process of attaching alloy tips to metal members which consists in heating the member by passing a current therethrough; heating the tip by conduction from the member; heating the tip and the member to welding heat by passing current through both the tip and the member; and welding said heated tip and member by applying pressure thereto.

4. The process of attaching alloy tips to metal members which consists in first positioning the tip on the member; then applying electrodes to the ends of the member;

then insulating the tip from the adjacent electrode; then passing current between the electrodes through the member; then removing the insulation; and finally passing current between the electrodes through the tip and the member.

5. The process of welding stellite to steel which consists in heating the steel in contact with the stellite by an electric current through the steel only and then heating the stellite and the steel in contact under welding pressure by an electric current through both the steel and the stellite.

6. The process of attaching hard alloy members to metal members, which consists in heating the alloy in contact with the metal by passing a heating current through the metal, and subsequently passing welding current through both members and simultaneously pressing the members together.

7. The process of welding a hard alloy to a steel member which consists in heating the member by passing an electric current therethrough, heating the alloy in position to a predetermined temperature by conduction from the member, subsequently heating both the alloy and the member to a welding heat by passing current through both of them, and finally applying a welding pressure to the heated parts.

8. The process of attaching hard alloy members to metal members, which consists in heating the alloy in contact with the metal by passing a heating current through the metal, and subsequently passing a welding current through both members and simultaneously pressing the members together.

9. The process of welding an alloy tip to a metal member which consists in first heating the tip in contact with the member by passing an electric current through the member only, then heating said tip and member under welding pressure by passing an electric current through both said tip and member in one direction, and then heating said tip and member under welding pressure by passing an electric current through both said tip and member in a direction at right angles to the first mentioned direction.

10. The process of permanently securing an alloy tip to a metal member which consists in forming a recess in the end of the member, then placing the tip in the recess, then heating the tip by conduction from the member by passing an electric current through the member only, and subsequently heating both the member and the tip to welding temperature by passing electric current through both the member and the tip, the member and the tip being first in parallel, and then in series with respect to said electric current.

In testimony whereof I affix my signature.

EVRAH C. LIPPS.